US012373122B2

(12) United States Patent
Varadarajan et al.

(10) Patent No.: US 12,373,122 B2
(45) Date of Patent: Jul. 29, 2025

(54) SYSTEM AND METHOD FOR MANAGING CLOUD-BASED DATA OWNERSHIP USING ACCESS REQUESTS

(71) Applicant: Microsoft Technology Licensing, LLC, Redmond, WA (US)

(72) Inventors: Krishnan Varadarajan, Redmond, WA (US); Malcolm James Smith, Bellevue, WA (US); Vijay Raghunathan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/507,269

(22) Filed: Nov. 13, 2023

(65) Prior Publication Data

US 2025/0156091 A1 May 15, 2025

(51) Int. Cl.
*G06F 3/06* (2006.01)

(52) U.S. Cl.
CPC .......... *G06F 3/0631* (2013.01); *G06F 3/0604* (2013.01); *G06F 3/0619* (2013.01); *G06F 3/067* (2013.01)

(58) Field of Classification Search
CPC .... G06F 3/0631; G06F 3/0604; G06F 3/0619; G06F 3/067
USPC ...................................................... 711/154
See application file for complete search history.

(56) References Cited

U.S. PATENT DOCUMENTS

| | | | |
|---|---|---|---|
| 11,956,231 B1 * | 4/2024 | Gorelik | H04L 63/0869 |
| 2016/0350547 A1 * | 12/2016 | Loughlin-Mchugh | G06Q 20/3827 |
| 2021/0216213 A1 * | 7/2021 | Shveidel | H04L 67/1001 |

* cited by examiner

*Primary Examiner* — Than Nguyen

(57) ABSTRACT

A method, computer program product, and computing system for processing a first data access request from a first computing device for accessing a cloud storage portion of a plurality of cloud storage portions associated with a cloud-based storage resource. A current ownership sequence identifier associated with the cloud storage portion is obtained. The current ownership sequence identifier from the cloud storage portion is compared to a previously obtained ownership sequence identifier for the cloud storage portion on the first computing device. The first data access request is effectuated on the cloud storage portion when the current ownership sequence identifier is identical to the previously obtained ownership sequence identifier.

17 Claims, 9 Drawing Sheets

SYSTEM AND METHOD FOR MANAGING CLOUD-BASED DATA OWNERSHIP USING ACCESS REQUESTS

BACKGROUND

Computer storage systems often depend upon establishing ownership of a large amount of data, such as a hard disk or virtual hard disk. A network or component failure causes ownership to be transferred to a new storage system/computing device, at which point, it is important for a previous owner to be unable to perform further actions on the data. The reason this is important is because storage systems establish caches of data, and depend on those caches accurately describing the data, which requires that only the system owning the cache can modify that portion of data. Ownership is typically exclusive, but can, in certain conditions, be shared among multiple co-owners. Industry protocols exist to describe this type of ownership, most notably persistent reservation.

Where data is distributed on a storage system, establishing ownership traditionally requires communicating among multiple servers storing data to describe the loss of ownership of one system, and the new ownership of another. Performing this process of communicating data ownership is computationally expensive (i.e., in terms of numbers of coordinating messages and time required to confirm signaling before messages are transmitted) across cloud-based storage resources.

BRIEF DESCRIPTION OF THE DRAWINGS

Like reference symbols in the various drawings indicate like elements.

DETAILED DESCRIPTION OF THE EMBODIMENTS

Figure 1A:
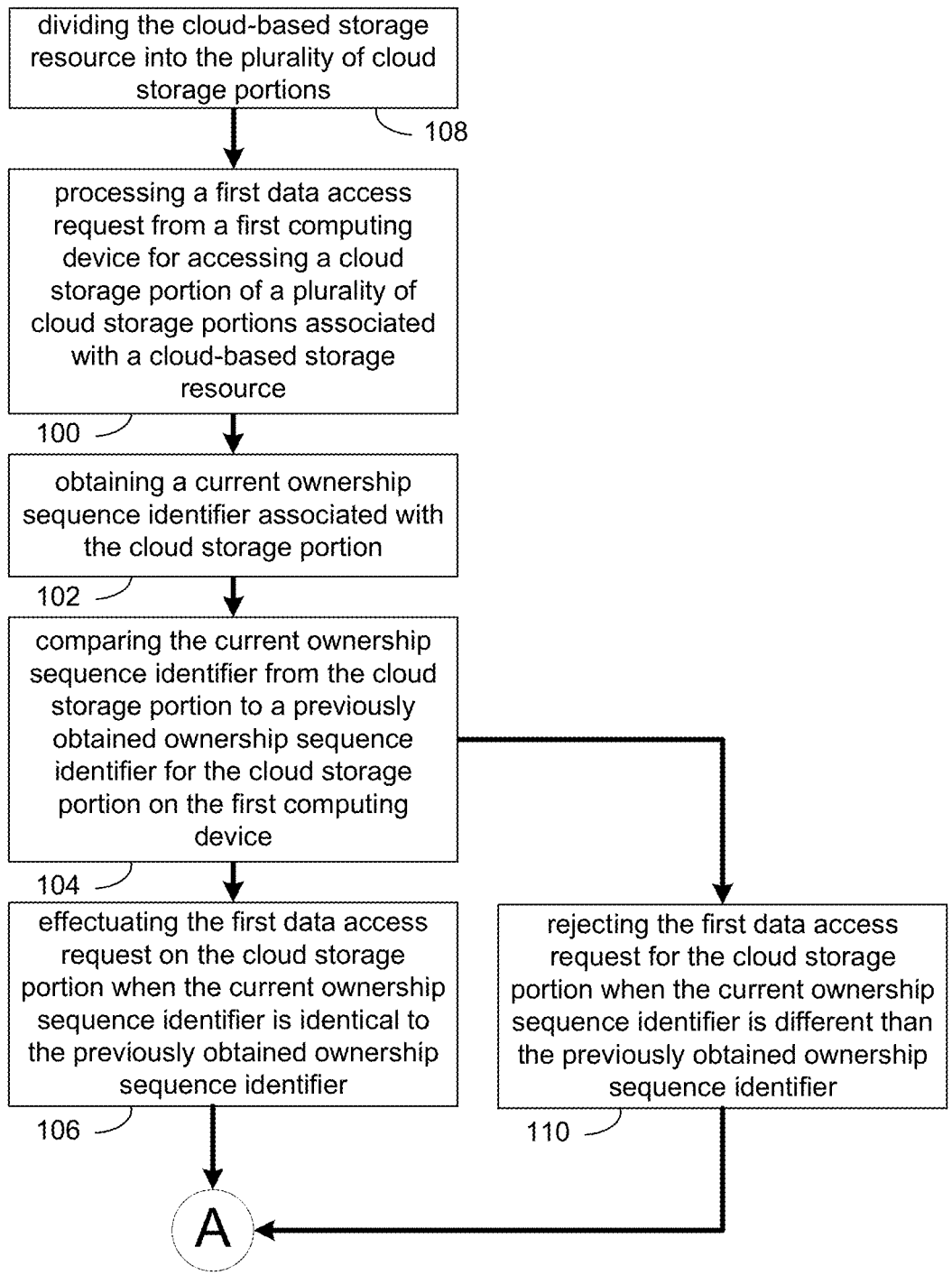
FIGS. 1A-1B are flow charts of one implementation of a cloud storage ownership process.
Figure 1B:
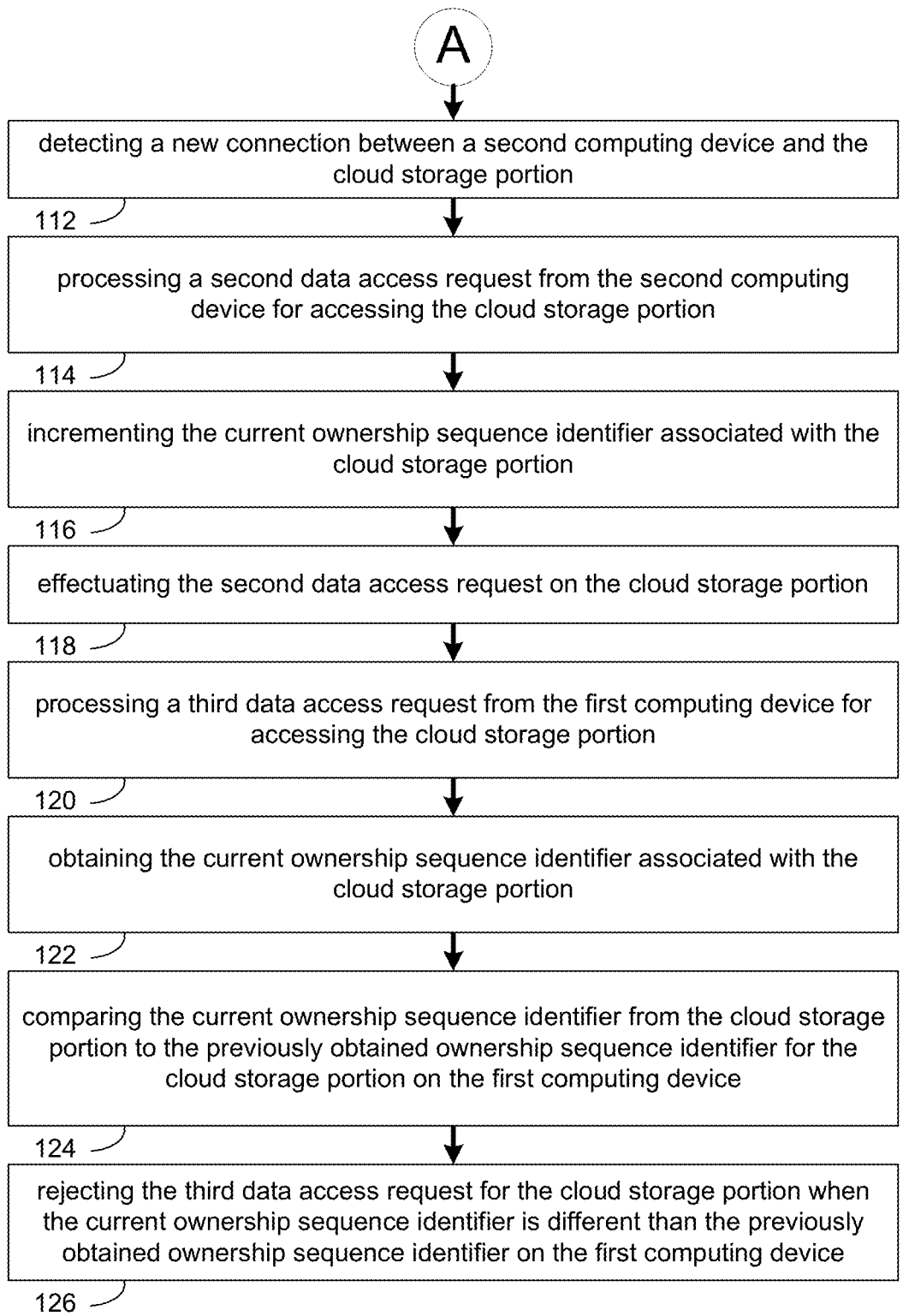

Implementations of the present disclosure manage ownership of particular portions of data by propagating changes in the ownership "lazily". For example, when a new owner (i.e., a new computing device) reads from or writes to a portion of data, the operation indicates to the computing device owning that portion of the data that the ownership has changed. In this model ownership is not strict (e.g., it is possible for two systems to both be reading and writing data concurrently, despite ostensibly having exclusive ownership). However, the act of a new owner determining the actions of a previous owner has the effect of preventing the previous owner from making further changes. The new owner is free to cache any data that it is able to access, and is guaranteed that having done so, its cached view will be correct. At any point in time, different computing devices may believe different owners can access the data.

As will be described in greater detail below, implementations of the present disclosure reduce the time to transfer ownership from one computing device/system to a new computing device/system. Rather than communicate with a large number of storage nodes, ownership is managed by a central authority, which can update ownership in a single place. Later reads and writes propagate this around the cloud-based storage resource/system. No new network messages are introduced in addition to regular read and write operations except to determine ownership after an ownership change has been detected. By reducing the number of computing devices involved in an ownership transfer, the transfer can complete more quickly, enabling computing devices to provide access (e.g., to read and/or write operations) to the data with minimal transition time. Conventional approaches require the communication of timestamps, demonstrating that one computing device can read one portion of data at one time, then a second computing device can write to a different portion, and the two computing devices would have to communicate outside of the cloud-based resource or cloud-based storage system to determine that the computing devices have communicated concerning the change in ownership.

As will be described in greater detail below, implementations of the present disclosure process a first data access request from a first computing device for accessing a cloud storage portion of a plurality of cloud storage portions associated with a cloud-based storage resource. A current ownership sequence identifier associated with the cloud storage portion is obtained. The current ownership sequence identifier from the cloud storage portion is compared to a previously obtained ownership sequence identifier for the cloud storage portion on the first computing device. The first data access request is effectuated on the cloud storage portion when the current ownership sequence identifier is identical to the previously obtained ownership sequence identifier.

The details of one or more implementations are set forth in the accompanying drawings and the description below. Other features and advantages will become apparent from the description, the drawings, and the claims.

The Cloud Storage Ownership Process:

Referring to FIGS. 1-6, cloud storage ownership process 10 processes 100 a first data access request from a first computing device for accessing a cloud storage portion of a plurality of cloud storage portions associated with a cloud-based storage resource. A current ownership sequence identifier associated with the cloud storage portion is obtained 102. The current ownership sequence identifier from the cloud storage portion is compared 104 to a previously obtained ownership sequence identifier for the cloud storage portion on the first computing device. The first data access request is effectuated 106 on the cloud storage portion when the current ownership sequence identifier is identical to the previously obtained ownership sequence identifier.

Ownership Sequence Identifiers

Figure 2:
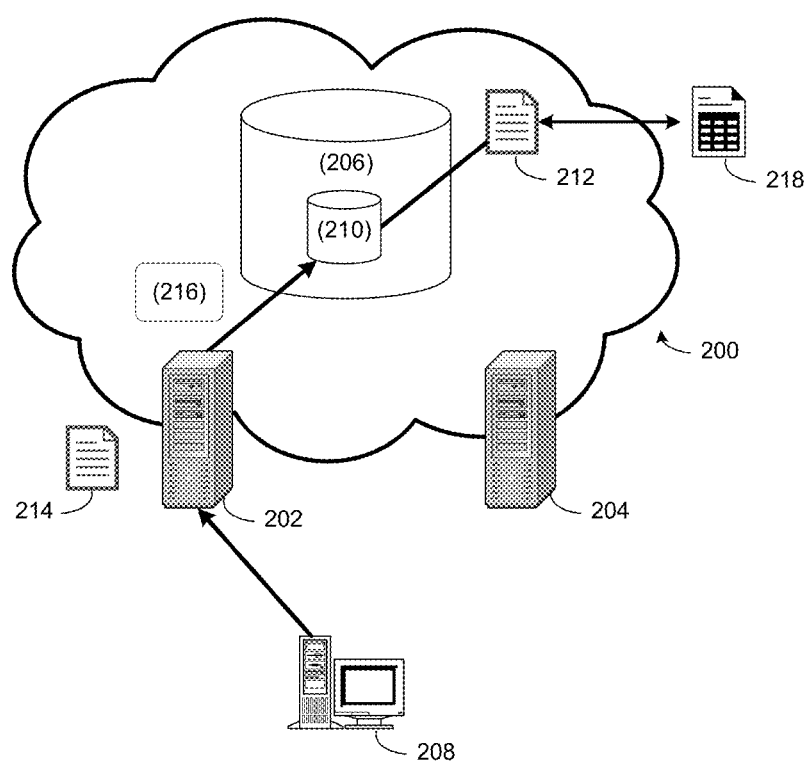
FIGS. 2-3 are diagrammatic views of the cloud storage ownership process of FIG. 1.

In some implementations, cloud storage ownership process 10 processes 100 a first data access request from a first computing device for accessing a cloud storage portion of a plurality of cloud storage portions associated with a cloud-based storage resource. Referring also to FIG. 2, a cloud-based storage system (e.g., cloud-based storage system 200) provides data storage in which data is stored on servers in various, off-suite locations. The servers are maintained by a provider who is responsible for hosting, managing, and securing data stored on its infrastructure. In one example, each cloud-based storage system 200 includes various computing devices (e.g., computing devices 202, 204) that access cloud-based storage resources (e.g., cloud-based storage resource 206) to store and retrieve data within cloud-based storage system 200. Cloud-based storage resource 206 includes hard disk (HD) storage capacity, solid-state disk (SSD) storage capacity, and/or virtual storage devices.

For example, a client computing device (e.g., client computing device 208) allows a user to obtain access to cloud-based storage system 200. In one example, client computing device 208 obtains permission to access cloud-based storage system 200 by providing log in credentials and establishing a connection to a computing device associated with cloud-based storage system (e.g., computing device 202). In FIG. 2, the connection between client computing device 208 and computing device 202 is represented by an arrow connecting client computing device 208 and computing device 202. In some implementations, when client computing device 208 establishes a connection with computing device 202, client computing device 208 provides data access requests to computing device 202. Computing device 202 establishes a connection with cloud-based storage resource 206 to read data from and/or to write data to cloud-based storage resource 206.

In some implementations, cloud storage ownership process 10 divides 108 the cloud-based storage resource into the plurality of cloud storage portions. For example, cloud-based storage resource 206 includes a defined amount of storage capacity. In some implementations, cloud storage ownership process 10 divides 108 cloud-based storage resource 206 into a plurality of cloud storage portions (e.g., cloud storage portion 210) where each cloud storage portion represents a defined amount of storage capacity. In one example, cloud storage portion 210 is one gigabyte (GB) of storage capacity within cloud-based storage resource 206. In some implementations, by cloud-based storage resource 206 into a plurality of cloud storage portions (e.g., cloud storage portion 210), cloud storage ownership process 10 is able to define "ownership" (i.e., the authority to modify the data) for each cloud storage portion.

For example, storage systems often depend upon establishing ownership of a large amount of data, such as a hard disk or virtual hard disk. A network or component failure causes ownership to be transferred to a new system, at which point, it is important for a previous "owner" to be unable to perform further actions on the data. This is important because storage systems establish caches of data, and depend on those caches accurately describing the data, which requires that only the storage system owning the cache can modify that portion of data. As will be discussed in greater detail below, by defining cloud storage portions with separate ownership, cloud storage ownership process 10 is able to provide more granular data ownership management within cloud-based storage system 200.

In some implementations, cloud storage ownership process 10 obtains 102 a current ownership sequence identifier associated with the cloud storage portion. For example, cloud storage ownership process 10 may define a current ownership sequence identifier (e.g., current ownership sequence identifier 212) that is a value (e.g., a number) that represents a current ownership state for a cloud storage portion. For example, suppose that computing device 202 establishes a connection with cloud-based storage resource 206 for accessing cloud storage portion 210. In this example, cloud storage ownership process 10 defines current ownership sequence identifier 212 as a value (e.g., "1") representing a current ownership state for cloud storage portion 210 where computing device 202 has ownership of cloud storage portion 210. In some implementations, the value of current ownership sequence identifier 212 is unrelated to the ownership by a particular computing device. In this manner, computing devices processing data access requests on cloud storage portion 210 can obtain 102 current ownership sequence identifier 212 and compare it to a previous ownership sequence identifier to determine whether the values match. Accordingly, a respective computing device within cloud-based storage system 200 only has to compare ownership sequence identifiers to determine if the computing device still has ownership (i.e., the ownership sequence identifier has not changed) or if the ownership has changed (i.e., the ownership sequence identifier has changed). In this manner, computing devices are not required to communicate with other computing devices to resolve ownership and are able to obtain and pass ownership without being aware of each computing device that accesses a given cloud storage portion.

In some implementations, cloud storage ownership process 10 compares 104 the current ownership sequence identifier from the cloud storage portion to a previously obtained ownership sequence identifier for the cloud storage portion on the first computing device. For example, suppose computing device 202 previously wrote data to cloud storage portion 210 at some point in time and in the process, obtained ownership over cloud storage portion 210. In that process, suppose that computing device obtained a copy of current ownership sequence identifier 212 (e.g., previous ownership sequence identifier 214). Now, suppose that after some period of time, computing device 202 provides a data access request (e.g., data access request 216) to access cloud storage portion 210. In this example, cloud storage ownership process 10 processes 100 data access request 216 and obtains 102 current ownership sequence identifier 212 for cloud storage portion 210. In one example, cloud storage ownership process 10 provides current ownership sequence identifier 212 to the first computing device (e.g., computing device 202) for comparison. In another example, cloud storage ownership process 10 obtains previous ownership sequence identifier 214 from the first computing device (e.g., computing device 202) for comparison.

In some implementations, cloud storage ownership process 10 effectuates 106 the first data access request on the cloud storage portion when the current ownership sequence identifier is identical to the previously obtained ownership sequence identifier. Continuing with the above example, suppose that cloud storage ownership process 10 compares current ownership sequence identifier 212 to previous ownership sequence identifier 214 of computing device 202. In this example, suppose that current ownership sequence identifier 212 is "1" and that previous ownership sequence identifier 214 is also "1". Accordingly, because current ownership sequence identifier 212 and previous ownership sequence identifier 214 are identical, computing device 202 is still the "owner" of cloud storage portion 210. In this example, cloud storage ownership process 10 effectuates 106 data access request 216 on cloud storage portion 210 because computing device 202 is the owner of cloud storage portion 210.

In some implementations, cloud storage ownership process 10 rejects 110 the first data access request for the cloud storage portion when the current ownership sequence identifier is different than the previously obtained ownership sequence identifier. Continuing with the above example, suppose that cloud storage ownership process 10 compares current ownership sequence identifier 212 to previous ownership sequence identifier 214 of computing device 202. In this example, however, suppose that current ownership sequence identifier 212 is "2" and that previous ownership sequence identifier 214 is "1" indicating a change in ownership for cloud storage portion 210. Accordingly, because current ownership sequence identifier 212 and previous ownership sequence identifier 214 are not identical, computing device 202 is no longer the "owner" of cloud storage portion 210. In this example, cloud storage ownership process 10 rejects 110 data access request 216 on cloud storage portion 210 because computing device 202 is not the owner of cloud storage portion 210.

Figure 3:
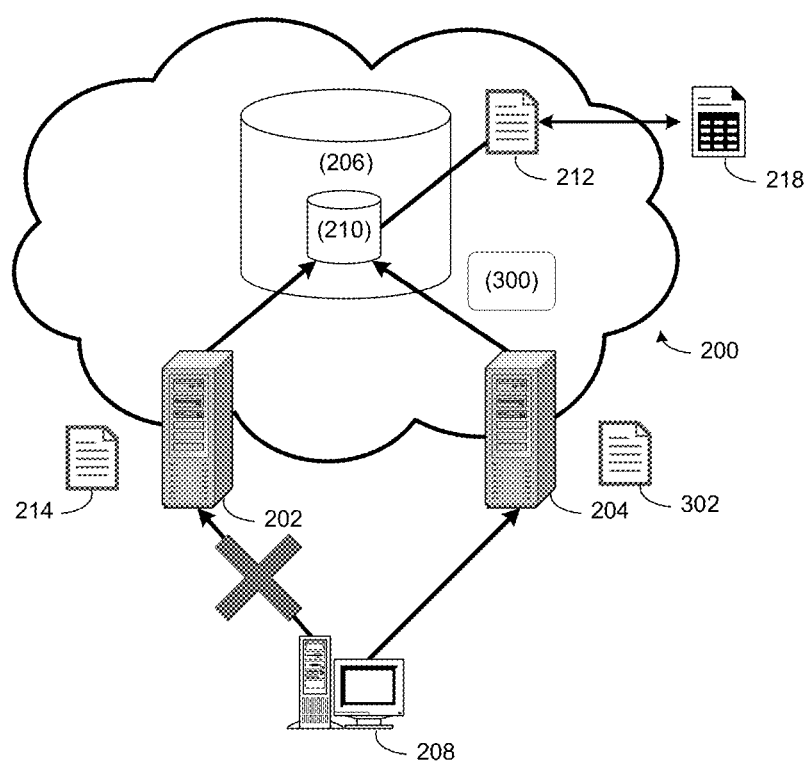

In some implementations, cloud storage ownership process 10 detects 112 a new connection between a second computing device and the cloud storage portion. For example, suppose the connection between client computing device 208 and computing device 202 fails (e.g., due to failure of computing device 202, failure of a network connection between client computing device 208 and computing device 202, etc.). In this example, due to the cloud configuration of cloud-based storage system 200, client computing device 208 can access cloud portion 210 using various computing devices or servers that appear seamless to a user of client computing device 208. Accordingly and as shown in FIG. 3, in response to a failed connection involving computing device 202, cloud storage ownership process 10 may facilitate a connection between a second computing device (e.g., computing device 204) and client computing device 208. In this example, cloud storage ownership process 10 detects 112 a new connection between computing device 204 and cloud storage portion 210. This is represented in FIG. 3 as the arrow between computing device 204 and cloud storage portion 210.

In some implementations, cloud storage ownership process 10 processes 114 a second data access request from the second computing device for accessing the cloud storage portion. For example, suppose computing device 204 provides a data access request (e.g., data access request 300). In this example, cloud storage ownership process 10 processes 114 data access request 300 to determine whether to effectuate the request. In this example, cloud storage ownership process 10 compares current ownership sequence identifier 212 against any previous ownership sequence identifier for computing device 204. As computing device 204 is newly connected to cloud-based storage resource 206, cloud storage ownership process 10 grants ownership of cloud storage portion 210 to computing device 204.

Accordingly, cloud storage ownership process 10 increments 116 the current ownership sequence identifier associated with cloud storage portion 210 to reflect the change in ownership of cloud storage portion 210 from computing device 202 to computing device 204. For example and continuing with the above example, with computing device 204 as the "owner" of cloud storage portion 210, the value of current ownership sequence identifier 212 is incremented 116 (e.g., from "1" to "2"). In some implementations, a copy of current ownership sequence identifier 212 is provided to computing device 204 (e.g., current ownership sequence identifier 302). With computing device 204 having ownership of cloud storage portion 210, cloud storage ownership process 10 effectuates 118 the second data access request on the cloud storage portion.

In some implementations, cloud storage ownership process 10 processes 120 a third data access request from the first computing device for accessing the cloud storage portion. For example and referring also to FIG. 4, suppose the first computing device (e.g., computing device 202) attempts to perform a data access request (e.g., data access request 400) on cloud storage portion 210. In this example, computing device 202 is unaware of the change in connection between client computing device 208 and the addition of computing device 204. For example, suppose computing device 202 had received an instruction to provide a data access request (e.g., data access request 400) before the connection between client computing device 208 and computing device 202 was lost. In another example, suppose that computing device 202 temporarily went offline but upon resuming communication with cloud storage portion 210, provided data access request 400 to cloud storage portion 210. Accordingly, cloud storage ownership process 10 processes 120 data access request and obtains 122 current ownership sequence identifier 212 associated with cloud storage portion 210.

Figure 5:
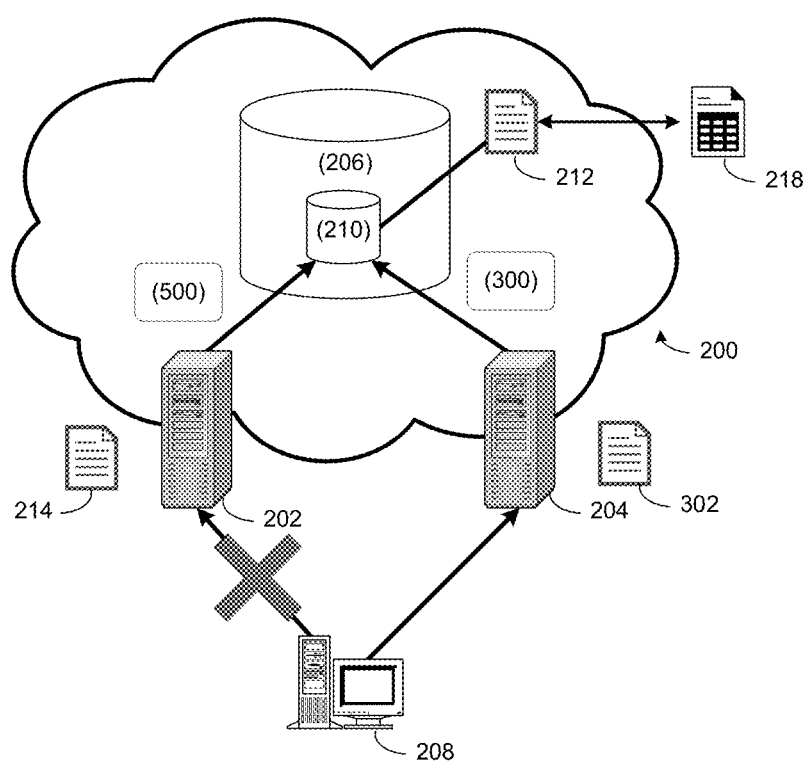
FIGS. 5-6 are diagrammatic views of the cloud storage ownership process of FIG. 1.
Figure 6:
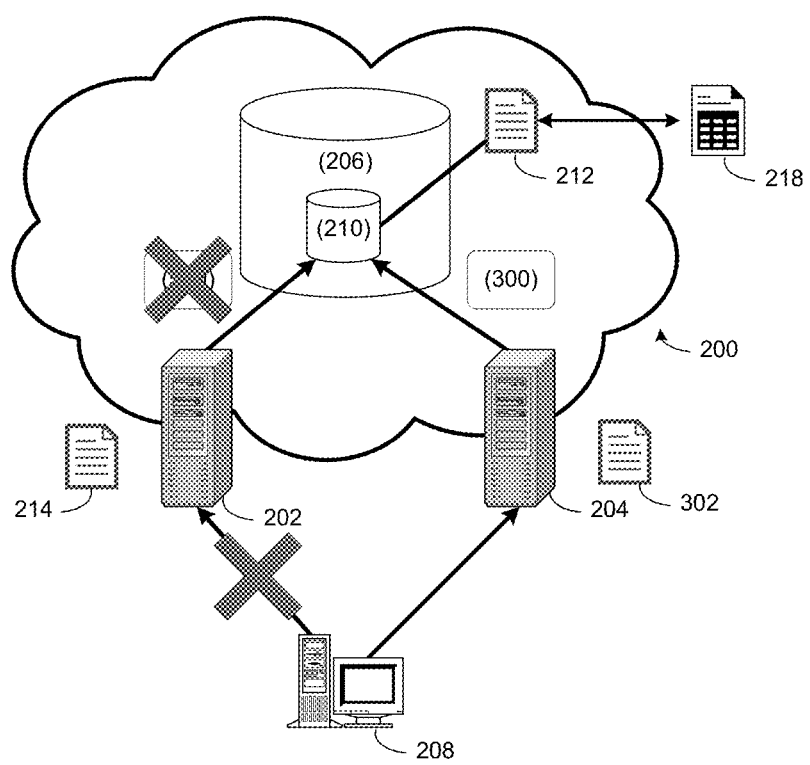

In this example, cloud storage ownership process 10 compares 124 current ownership sequence identifier 212 from cloud storage portion 210 to previously obtained ownership sequence identifier 214 for cloud storage portion 210 on computing device 202. In some implementations and as shown in FIG. 5, cloud storage ownership process 10 rejects 126 data access request 400 for cloud storage portion 210 because current ownership sequence identifier 212 is different than previously obtained ownership sequence identifier 214 on computing device 202. In the example of FIG. 5, the "X" symbol over data access request 400 indicates that data access request 400 is rejected 126 by cloud storage ownership process 10. In this manner, cloud storage ownership process 10 prevents computing device 202 from erroneously accessing data within cloud storage portion 210 after the ownership sequence identifier is updated to reflect computing device 204's ownership of cloud storage portion 210.

In some implementations, once cloud storage ownership process 10 determines a mismatch between current ownership sequence identifier 212 from cloud storage portion 210 to previously obtained ownership sequence identifier 214 for cloud storage portion 210 on computing device 202, computing device 202 checks cloud storage portion 210 for the current ownership. In this example, the current ownership is with computing device 204. Accordingly, computing device 202 either retries data access request 400 or rejects data access request 400 given the change in ownership to computing device 204.

Computing Device Connection Tables

Figure 4A:
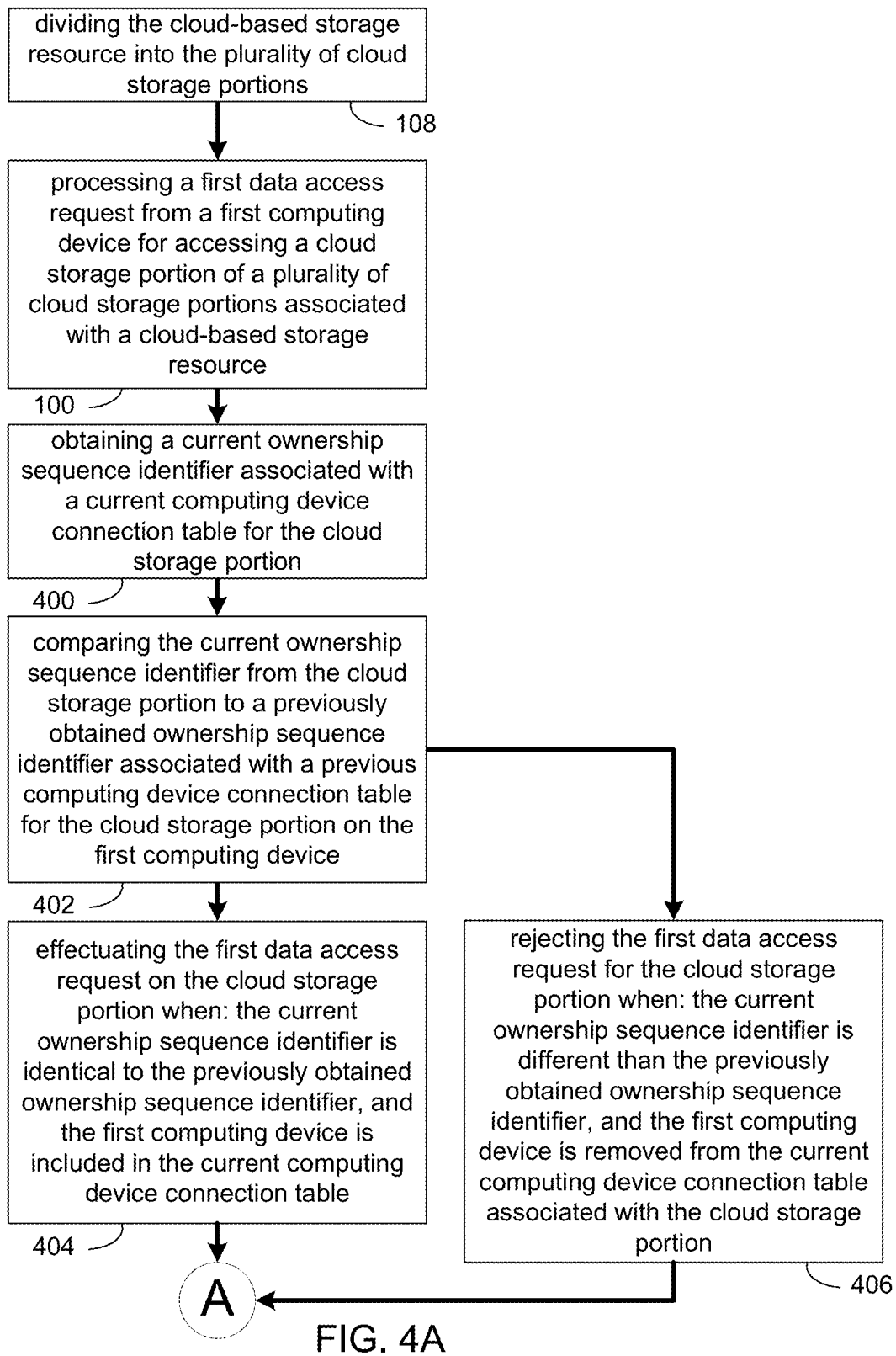
FIGS. 4A-4B are flow charts of one implementation of a cloud storage ownership process.
Figure 4B:
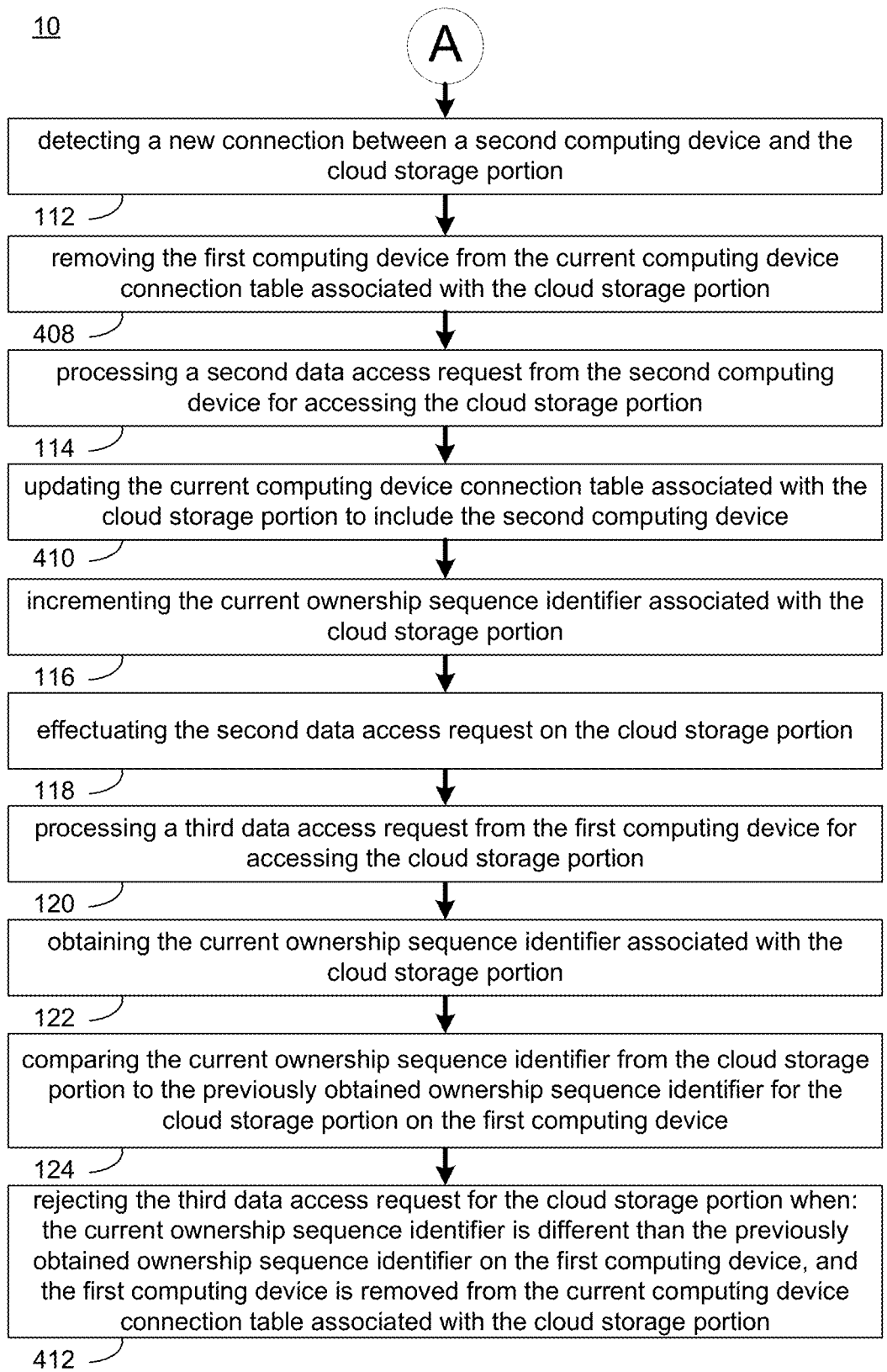

In some implementations and referring also to FIGS. 4A-4B, cloud storage ownership process 10 processes 100 a first data access request from a first computing device to obtain 400 a current ownership sequence identifier associated with a current computing device connection table for the cloud storage portion. For example, a computing device connection table is a table-based representation of the state of connections between computing devices and a cloud storage portion. In some implementations, current ownership sequence identifier represents the state of the computing device connection table. For example, if a computing device connection table changes with the new connection or ceasing of a connection of a computing device, the corresponding ownership sequence identifier is incremented or otherwise updated. Accordingly and in some implementations, as opposed to using current ownership sequence identifier to determine ownership (i.e., if a current ownership sequence identifier does not match a previous ownership sequence identifier, the data access request is rejected), cloud storage ownership process 10 uses changes in the current ownership sequence identifier to direct the computing device to access a current computing device connection table to determine whether or not to effectuate or to reject a data access request.

For example, cloud storage ownership process 10 compares a current ownership sequence identifier to a previously obtained ownership sequence identifier associated with a previous computing device connection table. Cloud storage ownership process 10 effectuates 404 a data access request on the cloud storage portion when: the current ownership sequence identifier is identical to the previously obtained ownership sequence identifier, and the first computing device is included in the current computing device connection table. By contrast and in some implementations, cloud storage ownership process 10 rejects 406 the first data access request for the cloud storage portion when: the current ownership sequence identifier is different than the previously obtained ownership sequence identifier, and the first computing device is removed from the current computing device connection table associated with the cloud storage portion.

Consider the following example involving computing device connection tables and specific types of data access requests. As will be discussed in greater detail below, cloud storage ownership process 10 allows read requests from subsequently connected computing devices to prevent write requests from removed computing devices from overwriting data within a cloud storage portion. In this manner, cloud storage ownership process 10 prevents a "rogue" removed or lost connection from a previous computing device from overwriting data being read by a subsequently connected computing device.

In some implementations, cloud storage ownership process 10 processes 100 a first write request from a first computing device for writing data to a cloud storage portion. Referring again to FIG. 2, suppose that computing device 202 establishes a connection with cloud storage portion 210. In this example, computing device 202 provides a write request (e.g., data access request 216). When processing 100 this write request, cloud storage ownership process 10 obtains 400 a current ownership sequence identifier (e.g., current ownership sequence identifier 212) associated with a current computing device connection table for cloud storage portion 210 and determines whether a previous ownership sequence identifier exists on computing device 202. In this example, suppose that computing device 202 does not initially have a previous ownership sequence identifier. Accordingly, cloud storage ownership process 10 updates the current computing device connection table (e.g., current computing device connection table 218) for cloud storage portion 210 to include computing device 202 and provides a copy of the updated ownership sequence identifier to computing device 202 (e.g., ownership sequence identifier 214). In one example, current computing device connection table 218 is maintained for cloud storage portion 210 by cloud-based storage resource 206. In another example, current computing device connection table 218 is maintained by another process or computing device within cloud-based storage system 200.

In some implementations, cloud storage ownership process 10 effectuates the first write request on the cloud storage portion when: the current ownership sequence identifier is identical to the previously obtained ownership sequence identifier, and the first computing device is included in the current computing device connection table. In this example, cloud storage ownership process 10 effectuates the write request (e.g., data access request 216) because current ownership sequence identifier 212 is identical to previously obtained ownership sequence identifier 214 and because computing device 202 is included in current computing device connection table 218.

In some implementations, cloud storage ownership process 10 removes 408 the first computing device from the current computing device connection table associated with the cloud storage portion. For example and referring again to FIG. 3, suppose the connection between client computing device 208 and computing device 202 fails (e.g., due to failure of computing device 202, failure of a network connection between client computing device 208 and computing device 202, etc.). In this example and in response to a failed connection involving computing device 202, cloud storage ownership process 10 removes 408 computing device 202 from current computing device connection table 218. In another example, cloud storage ownership process 10 removes 408 computing device 202 from current computing device connection table 218 in response to cloud-based storage system 200 detecting that computing device 202 is unavailable for a threshold amount of time.

In some implementations, cloud storage ownership process 10 detects 112 a new connection between a second computing device and the cloud storage portion. In this example, cloud storage ownership process 10 facilitates a connection between a second computing device (e.g., computing device 204) and client computing device 208. Cloud storage ownership process 10 detects 112 a new connection between computing device 204 and cloud storage portion 210. This is represented in FIG. 3 as the arrow between computing device 204 and cloud storage portion 210. In some implementations, cloud storage ownership process 10 updates 410 the current computing device connection table associated with the cloud storage portion to include the second computing device. For example, cloud storage ownership process 10 updates 410 current computing device connection table 218 to include computing device 204 as having connections with cloud storage portion 210.

In some implementations, cloud storage ownership process 10 increments 116 the current ownership sequence identifier associated with the cloud storage portion. For example and in response to updating 410 current computing device connection table 218 to include computing device 204, cloud storage ownership process 10 increments 116 or otherwise updates current ownership sequence identifier 212 to a new value indicative of a change in current computing device connection table 218.

In some implementations, cloud storage ownership process 10 processes 120 a second write request from the first computing device for writing data to the cloud storage portion. Referring again to FIG. 4, suppose that computing device 202 issues a write request (e.g., data access request 400) for writing data to cloud storage portion 210. In this example, cloud storage ownership process 10 processes 120 the write request (e.g., data access request 400) to identify cloud storage portion 210 and obtains 122 current ownership sequence identifier 212 associated with current computing device connection table 218 for cloud storage portion 210. Cloud storage ownership process 10 compares 124 current ownership sequence identifier 212 to previously obtained ownership sequence identifier 214 associated with a previous computing device connection table on computing device 202. As shown in FIG. 5, cloud storage ownership process 10 rejects 412 the second write request for the cloud storage portion when: the current ownership sequence identifier is different than the previously obtained ownership sequence identifier on the first computing device, and the first computing device is removed from the current computing device connection table associated with the cloud storage portion. In this example, cloud storage ownership process 10 rejects the write request (e.g., data access request 400) for writing data to cloud storage portion 210 because current ownership sequence identifier 212 is different than previously obtained ownership sequence identifier 214 on computing device 202 and because computing device 202 is removed or not present in current computing device connection table 218. The rejection of the write request (e.g., data access request 400) is shown in FIG. 5 with an "X" over data access request 400.

As discussed above and in some implementations, once cloud storage ownership process 10 determines a mismatch between current ownership sequence identifier 212 from cloud storage portion 210 to previously obtained ownership sequence identifier 214 for cloud storage portion 210 on computing device 202, computing device 202 checks cloud storage portion 210 for the current ownership (e.g., from computing device connection table 218). In this example, the current ownership does not include computing device 202 as computing device 202 was removed from computing device connection table 218. Accordingly, computing device 202 either retries data access request 400 or rejects data access request 400 given the change in ownership to not include computing device 202 (i.e., the removal of computing device 202 from computing device connection table 218).

In some implementations, cloud storage ownership process 10 processes a read request from the second computing device for reading data to the cloud storage portion. For example, suppose computing device 204 provides a read request (e.g., read request 402) for reading data from cloud storage portion 210. In this example, cloud storage ownership process 10 obtains current ownership sequence identifier 212 associated with current computing device connection table 218 for cloud storage portion 210. Cloud storage ownership process 10 compares current ownership sequence identifier 212 to previously obtained ownership sequence identifier 300 associated with computing device connection table 218 on computing device 204.

In some implementations, cloud storage ownership process 10 effectuates the read request on the cloud storage portion when: the current ownership sequence identifier is identical to the previously obtained ownership sequence identifier, and the second computing device is included in the current computing device connection table. For example, cloud storage ownership process 10 effectuates read request 402 because current ownership sequence identifier 212 is identical to previously obtained ownership sequence identifier 300 and because computing device 204 is included in current computing device connection table 218. Accordingly, cloud storage ownership process 10 allows a read request (e.g., read request 402) from a computing device (e.g., computing device 204) that subsequently connects to cloud storage portion 210 to be processed while rejecting a write request (e.g., data access request 214) from a previously connected computing device (e.g., computing device 202). In this manner, cloud storage ownership process 10 ensures that ownership of a cloud storage portion is managed without signaling overhead by using ownership sequence identifiers to indicate changes in ownership.

Figure 7:
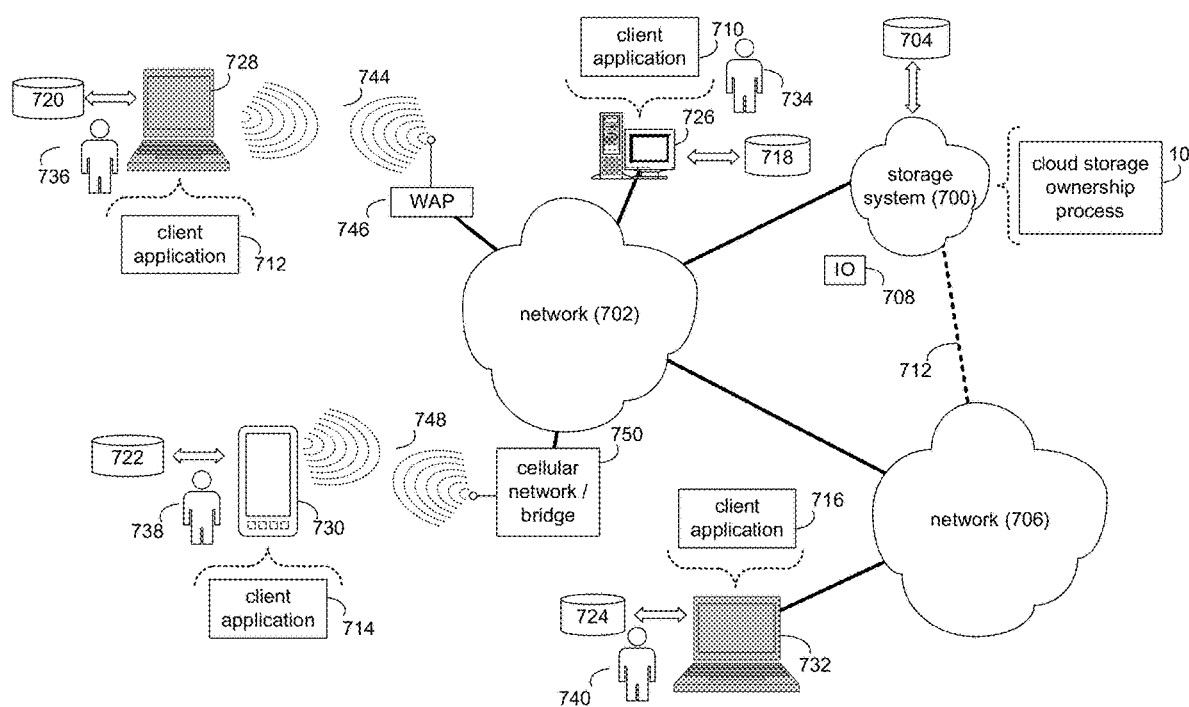
FIG. 7 is a diagrammatic view of computer system and the cloud storage ownership process coupled to a distributed computing network.

System Overview:

Referring to FIG. 7, a cloud storage ownership process 10 is shown to reside on and is executed by storage system 700, which is connected to network 702 (e.g., the Internet or a local area network). Examples of storage system 700 include: a Network Attached Storage (NAS) system, a Storage Area Network (SAN), a personal computer with a memory system, a server computer with a memory system, and a cloud-based device with a memory system. A SAN includes one or more of a personal computer, a server computer, a series of server computers, a minicomputer, a mainframe computer, a RAID device, and a NAS system.

The various components of storage system 700 execute one or more operating systems, examples of which include: Microsoft® Windows®; Mac® OS X®; Red Hat® Linux®, Windows® Mobile, Chrome OS, Blackberry OS, Fire OS, or a custom operating system (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of cloud storage ownership process 10, which are stored on storage device 704 included within storage system 700, are executed by one or more processors (not shown) and one or more memory architectures (not shown) included within storage system 700. Storage device 704 may include: a hard disk drive; an optical drive; a RAID device; a random-access memory (RAM); a read-only memory (ROM); and all forms of flash memory storage devices. Additionally or alternatively, some portions of the instruction sets and subroutines of cloud storage ownership process 10 are stored on storage devices (and/or executed by processors and memory architectures) that are external to storage system 700.

In some implementations, network 702 is connected to one or more secondary networks (e.g., network 706), examples of which include: a local area network; a wide area network; or an intranet.

Various input/output (IO) requests (e.g., IO request 708) are sent from client applications 710, 712, 714, 716 to storage system 700. Examples of IO request 708 include data write requests (e.g., a request that content be written to storage system 700) and data read requests (e.g., a request that content be read from storage system 700).

The instruction sets and subroutines of client applications 710, 712, 714, 716, which may be stored on storage devices 718, 720, 722, 724 (respectively) coupled to client electronic devices 726, 728, 730, 732 (respectively), may be executed by one or more processors (not shown) and one or more memory architectures (not shown) incorporated into client electronic devices 726, 728, 730, 732 (respectively). Storage devices 718, 720, 722, 724 may include: hard disk drives; tape drives; optical drives; RAID devices; random access memories (RAM); read-only memories (ROM), and all forms of flash memory storage devices. Examples of client electronic devices 726, 728, 730, 732 include personal computer 726, laptop computer 728, smartphone 730, laptop computer 732, a server (not shown), a data-enabled, and a dedicated network device (not shown). Client electronic devices 726, 728, 730, 732 each execute an operating system.

Users 734, 736, 738, 740 may access storage system 700 directly through network 702 or through secondary network 706. Further, storage system 700 may be connected to network 702 through secondary network 706, as illustrated with link line 742.

The various client electronic devices may be directly or indirectly coupled to network 702 (or network 706). For example, personal computer 726 is shown directly coupled to network 702 via a hardwired network connection. Further, laptop computer 732 is shown directly coupled to network 706 via a hardwired network connection. Laptop computer 728 is shown wirelessly coupled to network 702 via wireless communication channel 744 established between laptop computer 728 and wireless access point (e.g., WAP) 746, which is shown directly coupled to network 702. WAP 746 may be, for example, an IEEE 802.11a, 802.11b, 802.11g, 802.11n, Wi-Fi®, and/or Bluetooth® device that is capable of establishing a wireless communication channel 744 between laptop computer 728 and WAP 746. Smartphone 730 is shown wirelessly coupled to network 702 via wireless communication channel 748 established between smartphone 730 and cellular network/bridge 750, which is shown directly coupled to network 702.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    processing a first data access request from a first computing device for accessing a cloud storage portion of a plurality of cloud storage portions associated with a cloud-based storage resource;
    obtaining a current ownership sequence identifier associated with the cloud storage portion;
    comparing the current ownership sequence identifier from the cloud storage portion to a previously obtained ownership sequence identifier for the cloud storage portion on the first computing device;
    effectuating the first data access request on the cloud storage portion when the current ownership sequence identifier is identical to the previously obtained ownership sequence identifier;
    detecting a new connection between a second computing device and the cloud storage portion;
    processing a second data access request from the second computing device for accessing the cloud storage portion;
    incrementing the current ownership sequence identifier associated with the cloud storage portion; and
    effectuating the second data access request on the cloud storage portion.

2. The computer-implemented method of claim 1, further comprising:
    dividing the cloud-based storage resource into the plurality of cloud storage portions.

3. The computer-implemented method of claim 1, further comprising:
    rejecting the first data access request for the cloud storage portion when the current ownership sequence identifier is different than the previously obtained ownership sequence identifier.

4. The computer-implemented method of claim 1, further comprising:
    processing a third data access request from the first computing device for accessing the cloud storage portion;
    obtaining the current ownership sequence identifier associated with the cloud storage portion;
    comparing the current ownership sequence identifier from the cloud storage portion to the previously obtained ownership sequence identifier for the cloud storage portion on the first computing device; and
    rejecting the third data access request for the cloud storage portion when the current ownership sequence identifier is different than the previously obtained ownership sequence identifier on the first computing device.

5. The computer-implemented method of claim 1, wherein the current ownership sequence identifier is associated with a current computing device connection table for the cloud storage portion.

6. The computer-implemented method of claim 5, wherein the first data access request is effectuated on the cloud storage portion when: the current ownership sequence identifier is identical to the previously obtained ownership sequence identifier, and the first computing device is included in the current computing device connection table.

7. A computing system comprising:
    a memory; and
    a processor configured to process a first data access request from a first computing device for accessing a cloud storage portion of a plurality of cloud storage portions associated with a cloud-based storage resource, to obtain a current ownership sequence identifier associated with a current computing device connection table for the cloud storage portion, to compare the current ownership sequence identifier from the cloud storage portion to a previously obtained ownership sequence identifier associated with a previous computing device connection table for the cloud storage portion on the first computing device, to effectuate the first data access request on the cloud storage portion when: the current ownership sequence identifier is identical to the previously obtained ownership sequence identifier, and the first computing device is included in the current computing device connection table, to process a second data access request from the second computing device for accessing the cloud storage portion, to update the current computing device connection table associated with the cloud storage portion to include the second computing device, to increment the current ownership sequence identifier associated with the cloud storage portion, and to effectuate the second data access request on the cloud storage portion.

8. The computing system of claim 7, wherein the processor is further configured to:
    divide the cloud-based storage resource into the plurality of cloud storage portions.

9. The computing system of claim 7, wherein the processor is further configured to:
    reject the first data access request for the cloud storage portion when: the current ownership sequence identifier is different than the previously obtained ownership sequence identifier, and the first computing device is removed from the current computing device connection table associated with the cloud storage portion.

10. The computing system of claim 7, wherein the processor is further configured to:
    detect a new connection between a second computing device and the cloud storage portion.

11. The computing system of claim 10, wherein the processor is further configured to:
    remove the first computing device from the current computing device connection table associated with the cloud storage portion.

12. The computing system of claim 7, wherein the processor is further configured to:
   process a third data access request from the first computing device for accessing the cloud storage portion;
   obtain the current ownership sequence identifier associated with the cloud storage portion;
   compare the current ownership sequence identifier from the cloud storage portion to the previously obtained ownership sequence identifier for the cloud storage portion on the first computing device; and
   reject the third data access request for the cloud storage portion when: the current ownership sequence identifier is different than the previously obtained ownership sequence identifier on the first computing device, and the first computing device is removed from the current computing device connection table associated with the cloud storage portion.

13. A computer program product residing on a non-transitory computer readable medium having a plurality of instructions stored thereon which, when executed by a processor, cause the processor to perform operations comprising:
   processing a first write request from a first computing device for writing data to a cloud storage portion of a plurality of cloud storage portions associated with a cloud-based storage resource;
   obtaining a current ownership sequence identifier associated with a current computing device connection table for the cloud storage portion;
   comparing the current ownership sequence identifier from the cloud storage portion to a previously obtained ownership sequence identifier associated with a previous computing device connection table for the cloud storage portion on the first computing device;
   effectuating the first write request on the cloud storage portion when: the current ownership sequence identifier is identical to the previously obtained ownership sequence identifier, and the first computing device is included in the current computing device connection table;
   detecting a new connection between a second computing device and the cloud storage portion;
   processing a second data access request from the second computing device for accessing the cloud storage portion;
   incrementing the current ownership sequence identifier associated with the cloud storage portion; and
   effectuating the second data access request on the cloud storage portion.

14. The computer program product of claim 13, wherein the operations further comprise:
   dividing the cloud-based storage resource into the plurality of cloud storage portions.

15. The computer program product of claim 13, wherein the operations further comprise:
   removing the first computing device from the current computing device connection table associated with the cloud storage portion.

16. The computer program product of claim 13, wherein the operations further comprise:
   processing a second write request from the first computing device for writing data to the cloud storage portion;
   obtaining the current ownership sequence identifier associated with the current computing device connection table for the cloud storage portion;
   comparing the current ownership sequence identifier from the cloud storage portion to a previously obtained ownership sequence identifier associated with a previous computing device connection table for the cloud storage portion on the first computing device; and
   rejecting the second write request for the cloud storage portion when: the current ownership sequence identifier is different than the previously obtained ownership sequence identifier on the first computing device, and the first computing device is removed from the current computing device connection table associated with the cloud storage portion.

17. The computer program product of claim 16, wherein the operations further comprise:
   processing a read request from the second computing device for reading data to the cloud storage portion;
   obtaining the current ownership sequence identifier associated with the current computing device connection table for the cloud storage portion;
   comparing the current ownership sequence identifier from the cloud storage portion to a previously obtained ownership sequence identifier associated with the previous computing device connection table for the cloud storage portion on the second computing device; and
   effectuating the read request on the cloud storage portion when: the current ownership sequence identifier is identical to the previously obtained ownership sequence identifier, and the second computing device is included in the current computing device connection table.

* * * * *